(12) United States Patent
Quan et al.

(10) Patent No.: US 9,630,776 B1
(45) Date of Patent: Apr. 25, 2017

(54) PROXIMITY DIRECTED STOWAGE

(71) Applicant: Amazon Technologies, Inc., Seattle, WA (US)

(72) Inventors: Adrian Christopher Quan, Bainbridge Island, WA (US); Jamie Marie Holland, Seattle, WA (US); Kimberly Anne Lewis, Seattle, WA (US); Benjamin Lee Farrow, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/360,802

(22) Filed: Nov. 23, 2016

Related U.S. Application Data

(63) Continuation of application No. 15/181,184, filed on Jun. 13, 2016, now Pat. No. 9,527,668, which is a continuation of application No. 14/869,714, filed on Sep. 29, 2015, now Pat. No. 9,382,068.

(51) Int. Cl.
   *G06F 7/00* (2006.01)
   *B65G 1/137* (2006.01)
(52) U.S. Cl.
   CPC .................... *B65G 1/1371* (2013.01)

(58) Field of Classification Search
   None
   See application file for complete search history.

(56) References Cited

U.S. PATENT DOCUMENTS

| | | | |
|---|---|---|---|
| 9,382,068 B1 * | 7/2016 | Quan | G06Q 10/08 |
| 2001/0041948 A1 * | 11/2001 | Ross | G06Q 10/08 |
| | | | 700/226 |
| 2006/0184013 A1 * | 8/2006 | Emanuel | G01S 5/16 |
| | | | 600/426 |
| 2016/0260158 A1 * | 9/2016 | High | G05D 1/0297 |

* cited by examiner

*Primary Examiner* — Yolanda Cumbess
(74) *Attorney, Agent, or Firm* — Knobbe Martens Olson & Bear LLP

(57) ABSTRACT

Features are disclosed for using location awareness, bin capacity, and environmental cues to provide in context guidance to the associate when stowing items such as at a fulfillment center. In accordance with aspects of the present disclosure, the associate may scan an item he or she may want to stow. In response, lights on the bins in the associate's vicinity are illuminated to indicate bins in which the item can be stowed (e.g., because the item fits in the bin) without breaking stow etiquette. For example, in order to prevent mix up, stow etiquette may indicate that two types of erasers should not be stored in the same bin. As yet another example, stow etiquette may indicate that an item should not be stowed in a bin, even if it fits and there is room, so that a total weight for the bin is not exceeded.

20 Claims, 6 Drawing Sheets

PROXIMITY DIRECTED STOWAGE

CROSS-REFERENCE TO RELATED APPLICATIONS

This application is a continuation of U.S. patent application Ser. No. 15/181,184 filed on Jun. 13, 2016 entitled "PROXIMITY DIRECTED STOWAGE," which is a continuation of U.S. patent application Ser. No. 14/869,714 filed on Sep. 29, 2015 entitled "PROXIMITY DIRECTED STOWAGE" (issued on Jul. 5, 2016 as U.S. Pat. No. 9,382,068), the disclosures of which are hereby incorporated by reference in their entireties. Furthermore, any and all priority claims identified in the Application Data Sheet, or any correction thereto, are hereby incorporated by reference under 37 C.F.R. §1.57.

BACKGROUND

Electronic commerce has become increasingly popular with consumers as the accessibility and ease of placing orders electronically or via the Internet continues to improve. At the same time, network-based retailers have continued to expand the availability of products and items available for purchase, lease, or other type of acquisition, electronically or via the Internet to thousands, or even millions, of items. As a result, consumers may choose from an unprecedented variety of items without leaving the home. In order to offer this wide selection of items, some retailers maintain numerous strategically placed fulfillment centers or other physical storage facilities that store items. After a consumer has placed an order for an item electronically or via the Internet, an order is received at the storage facility, and the item is shipped from the storage facility to the consumer.

One way retailers may differentiate their service from others is the delivery model. For example, some retailers may provide one or two-hour deliveries for select inventory items. To support such fast order fulfillment, small fulfillment centers may be used either in busy areas or in conjunction with sort centers. These fulfillment centers may be compact and offer a limited number (e.g., 25,000) of items for customers in a confined space. This allows the retailer to be closer to people to make the delivery time and potentially only sell high velocity, or "in demand" items.

A side effect of this smaller space is less shelving to stow these items before they get ordered. This means items are crammed into the stow space, making it more difficult to find these items when it's time to pick a one-hour delivery. Difficulty determining which space is open also makes it hard to efficiently store items in a way that supports the delivery constraints.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
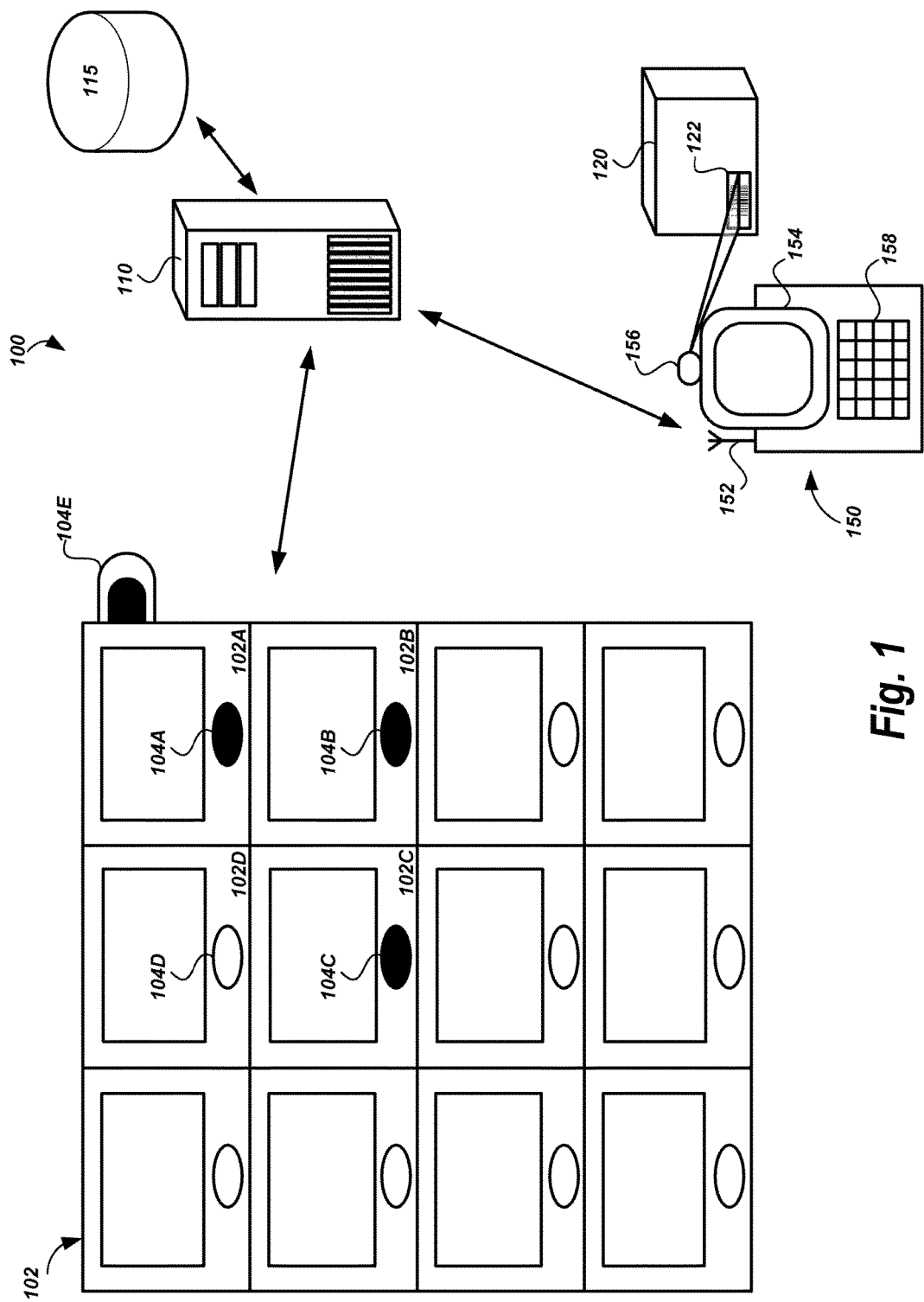
FIG. 1 is a pictorial diagram of a proximity directed stowage system.

Generally described, aspects of the present disclosure relate to a proximity directed stowage system that uses location awareness, stowage location capacity, and environmental cues to provide in context guidance to a human worker (an "associate") stowing items in stowage locations, such as bins, at a facility such as a fulfillment center. In accordance with aspects of the present disclosure, the associate may scan an item he or she may want to stow. In response, lights on the stowage locations in the associate's vicinity are illuminated to indicate locations in which the item can be stowed (e.g., because the item fits in the bin) without breaking stow etiquette. For example, in order to prevent mix up, stow etiquette may indicate that two types of erasers should not be stored in the same stowage location. As yet another example, stow etiquette may indicate that an item should not be stowed in a stowage location, even if it fits and there is room, so that a total weight for the location is not exceeded.

The features described herein address a variety of problems in the field of storage facilities. By leveraging several technologies, the features provide an accurate indication for physical placement of an item in physical storage space. The system and methods may integrate stowage location capacity or stowage location fullness in making recommendations. For example, the volume of all of the items in a bin may be measured to determine if a specific additional item would fit based on its physical characteristics such as volume.

The system and methods can also integrate the location of the resource performing the storing. For example, a scanner (such as a bar code scanner) may be used to identify which item is to be stored. The system and method may determine the location of the scanner within the storage facility and pair that with capacity information to help find optimal placement options for the item within bins located proximate the location of the scanner in the storage facility. In some implementations, instead of recommending a single placement, multiple locations may be recommended to provide more options in case one placement is too difficult (e.g., too high, obstructed), physical malfunctioning of a recommended location, or the like.

The system and methods may further consider stow etiquette represented in predefined stow rules. Predefined stow rules may exist for the storage facility and/or stowage locations therein. Stow rules may indicate what types of items may be stored in the same or nearby stowage locations. For example, it may be desirable to avoid storing a scented cleaning item in the same stowage location as an edible item. Stow rules may indicate fragile items can only be placed on low stowage locations (e.g., bottom row of a multi-level storage rack) to reduce the likelihood of dropping and damaging the item. Other stow rules may be implemented to enforce how items can be stowed. Features are described for using the stow rules to assess available stowage locations to provide the optimal placement near the scanned item. By providing this guidance during the stowage process, the time for stowing is reduced, the stowing process more efficient, and items are stowed in a manner that allows efficient retrieval.

The terms "physical item," "item," and "product" are used interchangeably and refer to physical objects. In a non-limiting example, physical items may include common items made available for purchase electronically or via the Internet, such as apparel, cookware, and physical media (e.g., DVDs or CDs). As used herein, the term "item," in addition to having its ordinary meaning, is used interchangeably to refer to an item itself (e.g., a particular product) and to its description or representation in a computer system or electronic catalog. As will be apparent from the context in which it is used, the term is also sometimes used herein to refer only to the item itself or only to its representation in the computer system.

In various embodiments, each item stored in a storage facility may be associated with a physical-item identifier that may be used to uniquely identify the item. In some embodiments, a physical-item identifier may be a stock keeping unit, Universal Product Code, global trade item number, and/or any other product/item identifier used to differentiate physical items. In an example, a toaster item may be uniquely associated with a first physical-item identifier, and a microwave item may be uniquely associated with a second physical-item identifier. In some embodiments, an item may be associated with a physical-item identifier different than a physical-item identifier associated with another item when the two items differ in one or more respects. In an example, two items identical in every respect except for at least one feature (e.g., color, capabilities, physical properties, manufacturers, models, date of manufacture, etc.) may be deemed as different items and, thereby, associated with different physical-item identifiers. While the above examples are intended to provide specific, non-limiting examples to demonstrate particular groupings/classifications of items, various other classification schemes used to associate an item with a particular physical-item identifier may be implemented in various embodiments without a loss of generality. For example, in some embodiments, different variations of an item (such as different colors or sizes of the same underlying clothing product by a given manufacturer) may share a single physical-item identifier. In other embodiments, such variations may each be assigned a different physical-item identifier.

FIG. 1 is a pictorial diagram of a proximity directed stowage system. The system 100 shown in FIG. 1 shows twelve stowage locations 102 (hereinafter individually or collectively referred to as stowage location 102). It will be appreciated that the system 100 may include more stowage locations (e.g., 1,000; 10,000; 25,000; 100,000; or more). Stowage locations may be implemented as one or more of bins, lockers, shelf locations, bays, shipping container, tubs, or other space for storing items. The system 100 shown in FIG. 1 includes homogenous stowage locations. It will be understood that different types, sizes, shapes, and configurations of stowage locations may be included within the system 100.

Each stowage location may be associated with an availability indicator. For example, a first stowage location 102A has a first availability indicator 104A. The first availability indicator 104A may be implemented as a light whereby the state of the light (e.g., on or off) indicates the state of availability for the associated stowage location. A second stowage location 102B, a third stowage location 102C, and a fourth stowage location 102D are also shown with respective availability indicators (e.g., 104B, 104C, 104D). The availability indicators 104A, 104B, and 104C indicate the available state while the indicator 104D is shown in the alternate state.

For ease of discussion, the availability indicator may be individually or collectively referred to as availability indicator 104. Although the first availability indicator 104A is shown in FIG. 1 as being near to the first stowage location 102A, other means may be used to indicate availability for the first stowage location 102A. For example, a display may be located near a cluster of stowage locations 102. The display may present a graphic representation of the cluster and availability indicated through the graphic representation. For example, the available locations may be shown in a first color (e.g., green) and all other locations in a second color (e.g., grey).

As shown in FIG. 1, an availability indicator 104E may also be included. The availability indicator 104E may be referred to as an availability wayfinder indicator. Such an indicator may be used to guide an associate to an area within a storage facility that includes an available stowage location. For example, the availability indicator 104E may be implemented as a light that indicates a row of stowage locations where a specific recommended stowage location is situated.

The state of the availability indicators 104 may be changed to indicate which stowage locations 102 are available to store an item 120. In some implementations, the state may be adjusted to indicate preference of a stowage location. The preference may be indicated as a degree or ranking of preference for a given stowage location as compared to other stowage locations. For example, different shades of green light may be used whereby darker shades of green indicate more desirable stowage locations than those stowage locations with availability indicators of a lighter shade of green. The preference of a stowage location may be based on a score indicating a degree of suitability of a given location to stow the item 120. Examples of how this score is generated are described in further detail below.

The item 120 may include an identifier 122 that can be detected. As shown in FIG. 1, a portable scanning device 150 may be used to optically scan the identifier 122, which may be implemented as a bar code. The portable scanning device 150 may include an optical scanner 156 configured to read the identifier 122. In some implementations, the identifier 122 may be a machine-readable code, e.g., optical code, one dimensional (1D) bar code, two dimensional (2D) bar code, recognizable text characters, or an image. In the case of a 2D bar code (also referred to as a "matrix code"), the identifier 122 may be a QR® or "quick response" code, an EZCode® bar code, a PDF417 or "portable data file" bar code, a high capacity color bar code, etc. In some implementations, the identifier 122 may not be optically detected. For example, the identifier 122 may be a tag such as a radio frequency identification (RFID) tag, near field communication (NFC) tag, or magnetic tag that provides item identification information. In such implementations, an RFID, NFC, or magnetic reader may be included on the portable scanning device 150.

In current systems, the item 120 is typically stored at the discretion of the associate performing the stowage. Thus, it may be necessary for the associate to approach, view and/or open several stowage locations 102 before identifying a stowage location that can fit the item. The stowage may be arbitrary and prone to etiquette violations either knowingly (e.g., to increase the reported rate of stowing) or unknowingly (e.g., lack of awareness of sensitive items in the location).

In the system 100, the portable scanning device 150 may transmit identification information for the item 120 to a directed stowage computing device 110. For example, the portable scanning device 150 may include a wireless transceiver 152 configured to transmit standardized, computer-readable messages to the directed stowage computing device 110. In some implementations, the communication may be direct between the portable scanning device 150 and the directed stowage computing device 110. In some implementations, the communication may be via a network (not shown).

The directed stowage computing device 110 may be in data communication with the stowage location 102 and configured to adjust the availability indicators 104 for the stowage locations 102 that can accommodate the item 120. The directed stowage computing device 110 may consider characteristics of the item 120 which may be stored in a data store 115. The directed stowage computing device 110 may further consider stow rules that may also be stored in the data store 115. The directed stowage computing device 110 may further consider the location of the portable scanning device 150 to provide a recommendation near the location of the item 120 and portable scanning device 150.

The location of the portable scanning device 150 may be included with the identification information for the item 120. The location may be determined by the portable scanning device 150 using a component integrated therein such as a global positioning system (GPS) receiver for use with a global positioning system. In other implementations, emissions from the wireless transmitter 152 of the portable scanning device 150 may be used as an alternative or additional source of location information. For example, the transmitted signal strength and direction may be used to estimate the location of the portable scanning device. In such implementations, the location of the portable scanning device 150 may be maintained by a scanning device location registry (not shown). Current location, prior locations, or a combination thereof may be stored in the scanning device location registry. The scanning device location registry may store information in the data store 115. In some implementations, the scanning device location registry may be a hosted network service configured to receive location information about scanning devices, store a history of locations for the scanning devices, and respond to requests for current or prior location information for the scanning devices. The scanning device location registry may be indexed using identifiers for the scanning devices such that a request including a scanning device identifier can be used to accurately retrieve the related location information. The scanning device location registry may include a machine interface for sending and receiving structured, unstructured, or semi-structured messages to request or obtain location information.

The registry may maintain location information for each active scanning device of the system 100 in association with an identifier (e.g., media access control (MAC) address, mobile equipment identifier (MEID), etc.) uniquely identifying the scanning device within the system 100. In such implementations, the identification information for the item 120 and the identifier for the scanning device may be transmitted to the directed stowage computing device 110. The directed stowage computing device 110 may use the identifier for the scanning device to query the registry to obtain the current location for the scanning device.

The portable scanning device 150 may also include a display 154 and an input interface 158. The display 154 may be a screen, touchscreen, or other visual display for providing feedback to a user of the portable scanning device 150. The input interface 158 shown in FIG. 1 is a keypad. Additional or alternative input interfaces may be included. For example, the display 154 may be a touchscreen and as such may function as both a display 154 and the input interface 158. Additional feedback may be provided by an audio output (not shown). For instance, when the item identifier 122 is successfully scanned, a beep may be emitted from an audio output. The display 154 may also be configured to present one or more availability indicators for recommended stowage locations. Such information may be received from the directed stowage computing device 110. In such implementations, the transceiver 152 may be configured to receive availability indication information through a wireless communication channel for presentation via the display 154.

Figure 2:
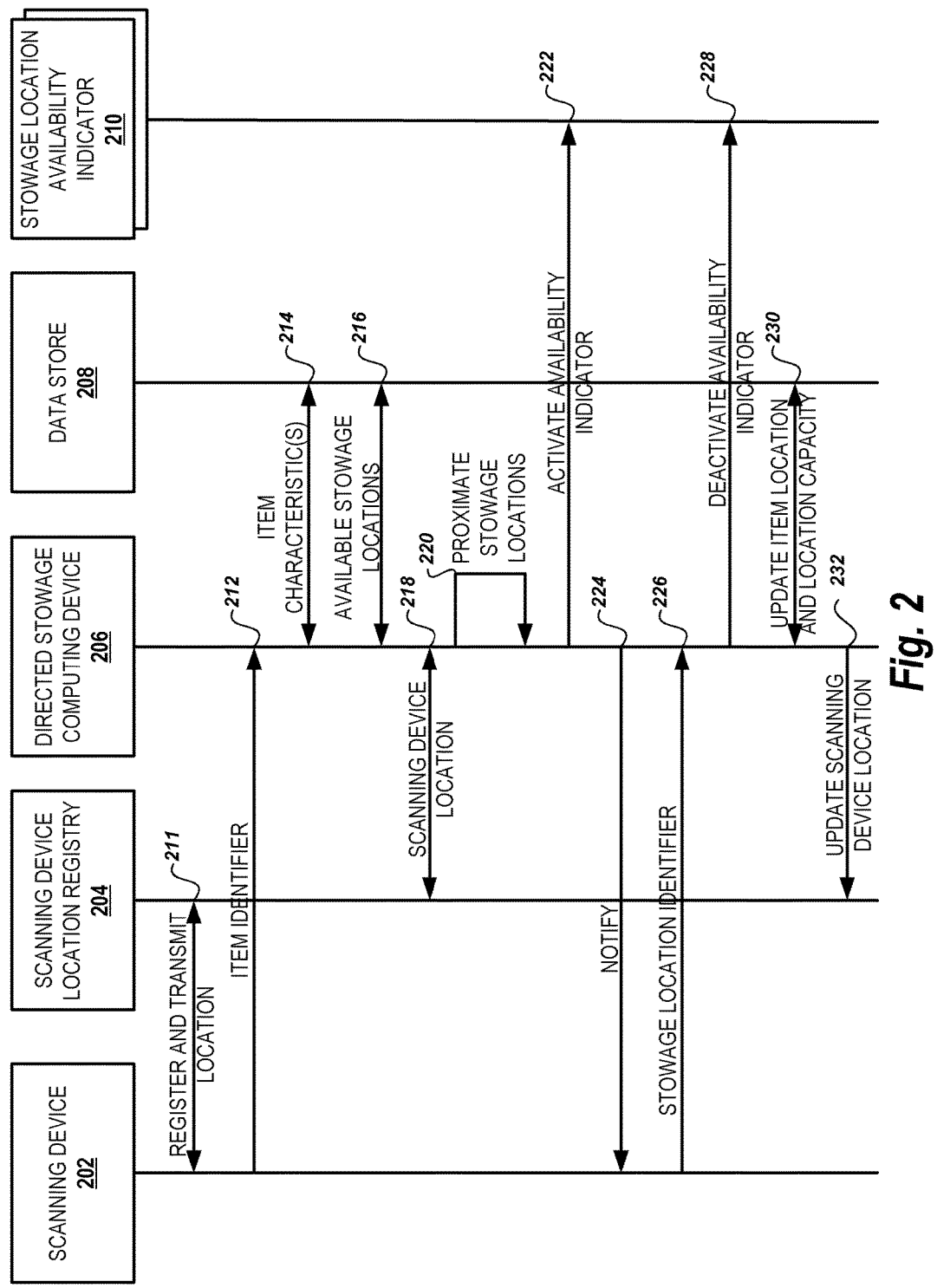
FIG. 2 is a schematic diagram of messages that may be sent between elements of a proximity directed stowage system during an example directed stowage session.

FIG. 2 a schematic diagram of messages that may be sent between elements of a proximity directed stowage system during an example directed stowage session. The diagram of FIG. 2 shows messages between a scanning device 202, a scanning device location registry 204, a directed stowage computing device 206, a data store 208, and a stowage location availability indicator 210. It will be appreciated that other intermediary elements may be included. For the sake of clarity, these intermediaries have been omitted from FIG. 2 and the description thereof.

Via message 211, the scanning device 202 registers and provides location information to the scanning device location registry 204. The scanning device 202 may be used by an associate who will be stowing items within the stowage facility. Upon powering up, the scanning device 202 may be configured to transmit a message to acquire location information and inform the scanning device location registry 204 that the scanning device 202 is ready for location tracking. In some implementations, the scanning device location registry 204 may be integrated with the scanning device 202.

The associate may scan an item to be stowed using the scanning device 202. Via message 212, the scanning device 202 may transmit item identification information for an item to be stored to the directed stowage computing device 206. As discussed with reference to FIG. 1, the item identification information may be obtained, e.g., optically, magnetically, or via radio.

Via message 214, characteristics of the item to be stored are retrieved from the data store 208. The data store 208 may include a library of item characteristics indexed by item identifier. Accordingly, for a given item identifier, one or more characteristics may be obtained. Characteristics may include physical characteristics of the item (e.g., weight, size, fragility, or scent), item type (e.g., book, music, perishable, liquid, hazardous), item quantity (e.g., single or multipack), and item popularity (e.g., how frequently ordered). In some implementations, a velocity metric may be generated as an indication of item popularity.

The velocity metric may be generated using a number of orders for the item over a period of time. The velocity metric may be generated using a number of times an item is viewed through an electronic catalog system. The velocity metric may be generated using a number of times an item is added to a wishlist or electronic shopping cart. The velocity metric may be generated using an amount of time the item has been available through an electronic catalog system, or generally released to the public. In some implementations, two or more of these factors, or other factors, may be used to generate the velocity metric.

Via message 216, the directed stowage computing device 206 receives a set of available stowage locations from the data store 208. The directed stowage computing device 206 may transmit a request for available locations. In some implementations, the request may include one or more of the characteristics of the item to be stowed. For example, the item weight and/or size may be used to identify locations that can accommodate the item's weight and/or dimensions.

Having developed a list of potential locations that could be used to store the item, via message 218, the directed stowage computing device 206 obtains the current location of the scanning device 202 from the scanning device location registry 204. Although not shown, the scanning device 202 may change locations after the time the item identifier is received by the directed stowage computing device 206. Accordingly, the location of the scanning device 202 at the time of message 210, 212 may not reflect the current location of the scanning device 202. Instead, FIG. 2 shows obtaining the scanning device 202 location information just prior to providing the recommendation.

Message 220 identifies a subset of the available locations that are near the scanning device 202. The identification may use a threshold distance such that any available location located within the threshold distance from the scanning device 202 location will be included in the subset.

Via message 222, availability indicators for the proximate stowage locations are activated. As shown in FIG. 2, the stowage location availability indicator 210 is activated. It will be appreciated that similar messaging to message 222 may be performed to activate the availability indicator for each of the proximate stowage locations. It will be further appreciated that more than one indicator for a proximate stowage location may be activated. For example, an availability wayfinder indicator may be activated in addition to an availability indicator for a proximate stowage location. The directed stowage computing device 206 may activate different types of availability indicators for each proximate stowage location. For example, one location may include a light while availability for another may be indicated via display panel. The indicator types may be included in the information about the stowage locations received from the data store 208. The indicators may help guide the associate to an appropriate stowage location for the item to be stowed. In some implementations, the indicators may be presented based on the associate for whom the guidance is provided. This can be useful in implementations where an associate may be color blind. The system may consider which associate is stowing the item and adjust the availability indicators such that they can be perceived by the associate. For example, a first associate may receive availability indicators in orange while another associate may receive availability indicators in green.

As shown in FIG. 2, the directed stowage computing device 206 transmits a notification via message 224 to the scanning device 202 indicating that indicators of availability for the proximate locations are activated. The associate may notice the notification as presented by the scanning device 202 and use this as a cue to look for the availability indicators for the available stowage locations. In some implementations, the message 224 may include a displayable representation of the available locations for presentation via a display, such as the display 154, of the scanning device 202.

The associate, or other actor performing the stowage, may then note around the immediate area to identify one of the proximate stowage locations to receive the item. The associate, or other actor performing the stowage, may then move to one of the stowage locations and obtain an identifier for the stowage location she will use to stow the item. The identification may be through scanning an identifier for the stowage location. As with the identifiers for an item, the identifiers for stowage locations may be optically, magnetically, or wirelessly scanned. The identification information for the selected location is transmitted to the directed stowage computing device 206 via message 226. The associate may then place the item into the stowage location. In some implementations, a second scan of the stowage location identifier may be performed to indicate stowage of the item was completed.

At this point, the item has been stored and the availability indicators for the proximate stowage locations may be deactivated by the directed stowage computing device 206 via message 228. The directed stowage computing device 206 may be configured to update the item location, stowage location capacity information, or both to reflect the receipt of the item via message 230.

Because the selected stowage location has a physical presence in the storage facility, the location of stowage location can be used to update the location of the scanning device 202. For example, as shown in FIG. 2, the directed stowage computing device 206, via message 232, updates the scanning device location registry 204 to reflect the location of the scanning device 202 as the location of the selected stowage location.

It is possible that the stowage location identifier received via message 226 is not associated with any of the proximate stowage locations. In such instances, the directed stowage computing device 206 may transmit a message to the scanning device 202 to obtain feedback. The feedback may provide a list of reasons as to why none of the recommended proximate locations were used to store the item. For example, the reasons may include: mechanical failure, locations obstructed, out of reach, or closer location found. The feedback information may be used by the directed stowage computing device 206 in making future directed stowage recommendations for this scanning device 202, the user of the scanning device 202, and other users/devices in the system 100. For example, if feedback indicated a stowage location was not selected because of mechanical failure, the location may be removed from consideration for stowing further items until the failure is addressed. Removing a stowage location from consideration may include setting a value in the data store 208 associated with the stowage location to indicate removal.

The feedback may be obtained by displaying the feedback options on a display of the scanning device 202, receiving a selection of one or more feedback options via an input device of the scanning device 202, and transmitting the selection to the directed stowage computing device 206. Machine learning may be applied using the stowage history (e.g., for a given set of proximate locations, which location is actually selected) and feedback to improve stowage recommendations. For example, a latent pattern for a given user may be discovered such that the user prefers to store items in the lower three levels of a multi-level storage rack. Such recommendation models may be constructed and used by the directed stowage computing device 206 to identify stowage locations.

In several implementations, an associate is used as the actor performing the stowage. It will be appreciated that another, non-human actor, such as an automated stowage system, may be used to perform the stowage. As such, the proximity directed stowage messages and information described may be formatted to control operation of the non-human actor.

Figure 3:
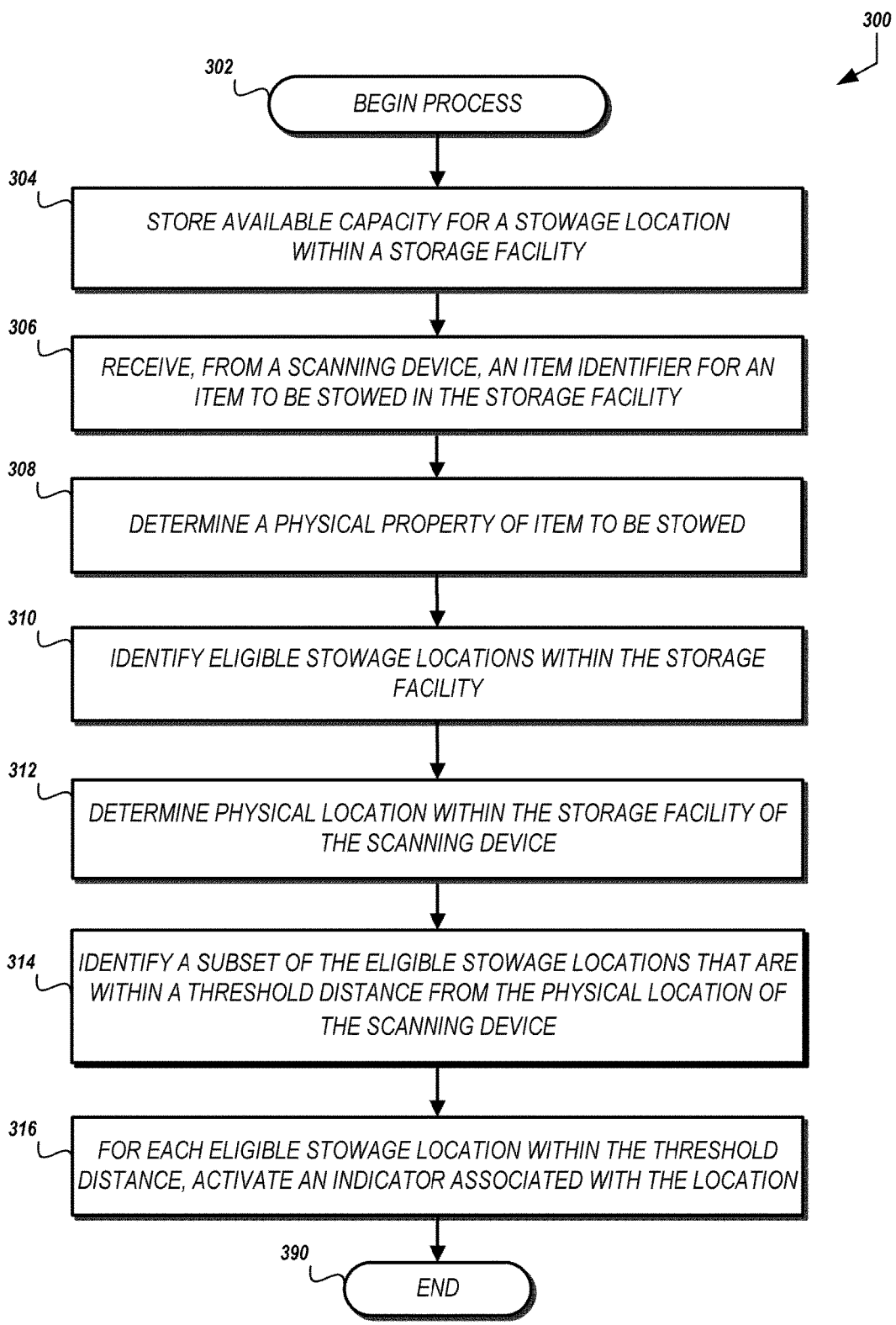
FIG. 3 is a flow diagram of an example method of proximity directed stowage.

FIG. 3 is a flow diagram of an example method of proximity directed stowage. The method 300 may be implemented in whole or in part by one or more of the devices described herein such as the directed stowage computing device 110 or 206 shown in FIG. 1 or FIG. 2, respectively.

The method depicted in FIG. 3 begins at block 302. At block 304, available capacity for a stowage location within a storage facility is stored. The available capacity may indicate a size, a weight, or both for the stowage location. In some implementations, the available capacity may be indicated by maintaining a total capacity for the location in conjunction with identifiers for items stored in the location.

At block 306, an item identifier for an item to be stored in the storage facility is received from a scanning device, e.g., scanning device 202. The item identifier may be received, at least in part, via a wireless communication channel from the scanning device. The item identifier may be character data, image data, binary data, or a combination thereof.

At block 308, a physical property of the item to be stowed is determined. The determination may be performed using the item identifier to retrieve the physical property from a data store, e.g., data store 208. For example, the data store may include a catalog of items indexed by identifier. A catalog entry for the item may include physical properties of the item such as dimensions or weight.

At block 310, eligible stowage locations within the storage facility are identified. Eligible stowage locations are those which have the physical capacity to accommodate the item to be stowed. The identification may include determining physical properties of items stored in particular stowage locations and reducing the available capacity for the stowage location to account for the dimensions and/or weights of the items stored. The remaining space may be identified as the available space. In some implementations, a buffer factor may be included. The buffer factor may be an amount of space or weight that is added to the current capacity of a stowage location to account for space that is needed within the stowage location between items. For example, if two boxes are stored in a stowage location, it is unlikely that the total space consumed by the two boxes is simply the combined volume. To ensure the items can be taken out of the stowage locations, some space may be included between the items. The buffer factor may be determined based on the stowage location type, number of items, specific items stored in the stowage location, or some combination thereof. In some implementations, several buffer factors may be identified (e.g., one for the stowage location and one for each item in the stowage location). The buffer factors may be retrieved from the data store. Equation (1) below provides an expression of how the available space may be determined for a stowage location:

$$\text{available\_space}_{loc} = s_{loc} - \left( b_{loc} + \sum_{i=0}^{n} (b_i + s_i) \right) \quad \text{Eq. (1)}$$

where $s_{loc}$ is a size of the stowage location,
$b_{loc}$ is a buffer factor for the stowage location,
n is the number of items in the stowage location,
$s_i$ is a size of item i included in the stowage location, and
$b_i$ is a buffer factor for the item i included in the stowage location.

A similar equation may be used to express how available weight capacity may be determined for a stowage location.

Having determined the stowage locations within the storage facility that can accommodate the item to be stowed, at block 312, the physical location of the scanning device within the storage facility is determined. The physical location may be determined through location information provided by the scanning device. For example, the scanning device may include a GPS receiver configured to receive location information. In some implementations, the scanning device may include a camera configured to capture an image of an area near the scanning device. Using image recognition techniques to identify known landmark elements included in the image, the scanning device may determine its location. For example, the image may include distinctive characters identifying a storage rack within the storage facility. Using the characters, the location of the storage rack can be retrieved from a data store. Further calculations based on the image can be performed to refine the location information for the scanning device. For example, the size of the lettering can be used to determine how far away the scanning device is from the storage rack. This distance in combination with the known location of the storage rack can be used to calculate the scanning device location information. In some implementations, the scanning device may include a wireless transceiver. Signals sent or received by the scanning device may be used to identify the location of the scanning device. One example of such a location determination system is generally referred to as a Wi-Fi positioning system (WPS). Each of the described location determining features may be used in the alternative or in combination to provide location information.

In some implementations, a location registry, e.g., scanning device location registry 204, may be used to store the location information for a scanning device. The location registry may be integrated with the scanning device or remotely located from the scanning device. In remote deployments, the scanning device may communicate current location information to the registry via wireless means.

At block 314, a subset of the eligible stowage locations that are within a threshold distance from the physical location of the scanning device is identified. This will ensure that of the eligible locations, those within the threshold distance to the actual location of the scanning device (and thus item to be stowed) are indicated. Further details and examples of how the subset is identified are provided with reference to FIG. 4 below.

At block 316, for each eligible stowage location within the threshold distance, an indicator associated with the location is activated. Activation may include transmitting an instruction to display the indicator. The instruction may be transmitted via a message from a directed stowage computing device to a stowage location availability indicator, e.g., stowage availability indicator 210. The message may be a machine-readable, standardized message including information indicating how the indicator should be displayed. For example, in some implementations, different color indicators may be used to allow different users to identify which indicators are displayed for them. For instance, a first user may look for purple indicators to indicate available space while a second user may look for yellow indicators.

In some implementations, an availability indicator controller may transmit signals to the stowage location availability indicator. The availability indicator controller may be in data communication with one or more indicators for one or more stowage locations. For example, a wired connection may exist from the availability indicator controller to an indicator. The availability indicator controller may receive a message identifying the stowage locations for the item to be stowed and transmit a control signal to the indicator(s) to be activated. In some implementations, the indicator may be provided for graphic display. For example, a map of a portion of the storage facility may be presented which includes visual indicators for the available stowage location. In some implementations, the availability indicator controller may be implemented as a hardware device mounted on or otherwise integrated with a storage location.

At block 390, the process ends having identified a subset of eligible stowage locations and activated indicators associated with the locations for stowing an item.

Figure 4:
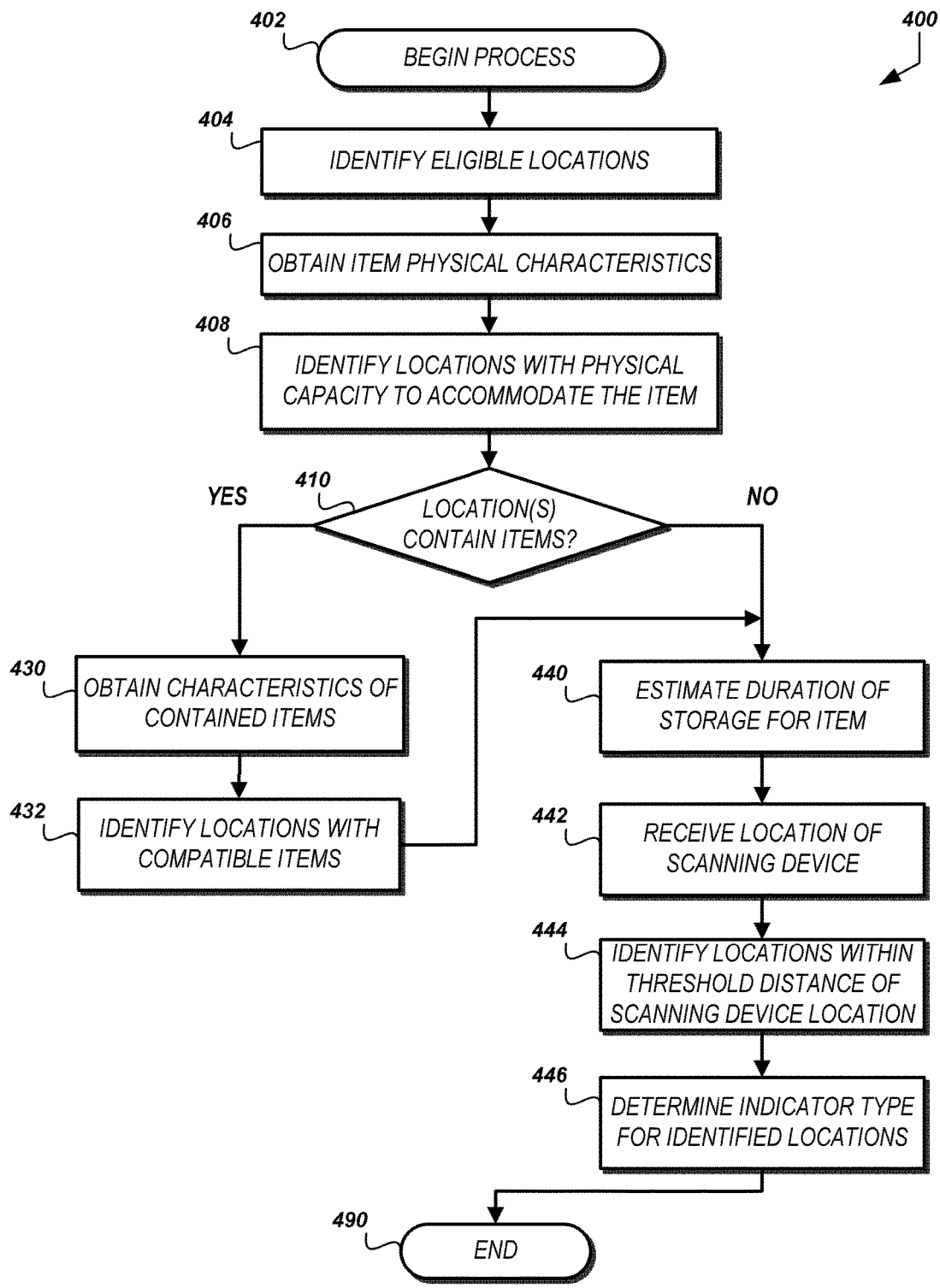
FIG. 4 is a flow diagram of an example method of identifying a subset of eligible stowage locations.

FIG. 4 is a flow diagram of an example method of identifying a subset of eligible stowage locations. The method 400 may be implemented in whole or in part by one or more of the devices described herein such as the directed stowage computing device 110 or 206 shown in FIG. 1 or FIG. 2, respectively.

The method begins at block 402. At block 404, eligible locations within the storage facility are identified. In some implementations, a directed stowage computing device may direct stowage for multiple storage facilities. In such implementations, the identification may be initiated by a request including an identifier for the storage facility where the item will be stored. Some stowage locations within the identified storage facility may be reserved or unavailable. For example, some locations may be broken or obstructed and thus cannot receive items.

Having identified the eligible set of stowage locations, at block 406, physical characteristics of the item to be stored may be obtained. The characteristics may be obtained from a data store, e.g., data store 115, using item identification information as discussed above.

At block 408, eligible locations within the storage facility that have capacity to store the item are identified. Equation (1) above provides one example of how size may be used as a factor to identify eligible locations. Weight may be another physical characteristic used to identify eligible locations.

At block 410, a determination is made as to whether the eligible locations with capacity contain items. This determination is made to ensure that the item to be stowed is stowed with compatible items. For example, it may be desirable to store a heavy item in a different location than a fragile item. As another example, it may be desirable to store scented items such as candles or detergent apart from absorbent items like clothing. In some implementations, it may be desirable to avoid stowage of an item proximate to a location including items having a specific characteristic. For example, an aromatic item may be stored in a first stowage location. The item to be stowed may have a physical characteristic that indicates the item is likely to absorb strong scents, or the item is of a type that should not be near scented items (e.g., perishable goods). In such instances, it may be desirable to exclude stowage locations within a certain distance from the stowage location that includes the aromatic item. The stowage may be directed using a property of the aromatic item (e.g., do not store absorbent items within a specified distance of the item), a property of the item to be stowed (e.g., do not store within a specified distance of an aromatic item), or a combination thereof. Aromatics present one example of proximity limits for stowage, flammability of an item is another characteristic which may be considered when identifying stowage locations.

If the determination is affirmative, at block 430, characteristics of the contained items are obtained. The characteristics may include item type, item quantity, item popularity, or any combination thereof. In the example of an aromatic item, the characteristic may indicate the distance scent may travel from a location storing the aromatic item. In the example of an absorbent item, the characteristic may indicate a degree of absorbency, a minimum distance from a scented item, perishable nature of the item, or the like. In the example of a flammable item, the characteristic may indicate a minimum distance from another flammable item. The characteristics may be obtained from a data store such as the data store 115 shown in FIG. 1. The identifiers for each of the contained items may be used to retrieve the characteristics from the data store.

The characteristics may be obtained for each of the identified locations with capacity. In some implementations, it may be desirable to limit the number of records obtained. In such implementations, the characteristics may be obtained for a subset of the identified locations with capacity. The subset of locations may be identified using location information for the scanning device. For example, if the storage facility has three levels, it may be desirable to retrieve characteristics for items in the available stowage locations on the same level as the current location of the scanning device. The subset of stowage locations for which to obtain item characteristics may be identified using a threshold number of contained items. For example, it may be desirable to reduce the resources the system uses to identify stowage locations. In such implementations, item characteristics for stowage locations with a threshold number of items (e.g., 10, 7, 5, or 2) or fewer may be retrieved.

At block 432, the characteristics of the item to be stowed are compared with the item characteristics retrieved at block 430. The comparison determines whether the item to be stored is compatible with the items in the locations with capacity and/or items stowed in locations near the locations with capacity. The system may store stow rules that may be evaluated by the system to perform the comparison. The stow rules may be specified as a list of conditions that must be satisfied for the items within a stowage location. Table 1 below includes some example stow rules that may be implemented.

TABLE 1

| Item to Be Stowed | Item in Stowage Location | Items Compatible? |
|---|---|---|
| Item type = book | Item type = flammable | No |
| Item manufacturer = PaperCo AND Item quantity = multipack | Item manufacturer = PaperCo AND Item quantity = single | No |
| Item velocity = 20 | Item velocity > 30 | No |
| Item artist = Justin Timberlake | Item artist = Taylor Swift | Yes |

The stow rules may be specified for an entire storage facility, for specific stowage location types (e.g., bin type), stowage resource (e.g., which person is performing the storage), or a combination thereof. When multiple stow rules are specified, a hierarchy may be used to determine which rules are most important and which are less important. In some implementations, the system may generate a compatibility metric indicating a degree to which a location contains items compatible with the item to be stored. The compatibility metric may be used to rank stowage locations with available capacity to identify the locations likely to yield the most stowage with a desired level of etiquette adherence. The desired level may be specified as a compatibility threshold whereby locations having a compatibility metric that at least meets the compatibility threshold level will remain in consideration for storing the item.

At block 432, the characteristics of the item to be stowed may also be compared with the item characteristics retrieved at block 430 for items in locations near the locations with capacity. For example, it may be desirable to avoid stowing a perishable item in a stowage location three feet or less away from a stowage location that includes laundry detergent.

Once the locations with compatible items are identified, or if the locations do not contain items, at block 440, the method generates an estimated stowage time indicating an estimated duration of stowage for the item to be stored. The estimated duration may be generated using the popularity of the item such that an item ordered frequently, will have a lower estimated duration than an item ordered less frequently. The stowage duration estimate may also consider a characteristic of the item to be stored. For example, if the item to be stored is perishable, it likely has an expiration date. This expiration date may be used as the stowage duration estimate or a factor for generating the estimate. The estimate may be used to limit the number of locations with capacity that will be considered for stowage. For example, it may be desirable to store items with a low estimated stowage time in stowage locations that are more easily accessible than others. The accessibility may be indicated by the distance from the floor (e.g., lower locations are easier to stow and retrieve from accurately), location within the storage facility (e.g., locations closer to packing area within the storage facility are preferred for items with low stowage duration estimate), or the like. Accessibility of a stowage location may be identified using an accessibility factor. An accessibility factor may indicate the ease of accessibility to a respective eligible stowage location.

At block 442, the location of the scanning device is received. The location may be received from the scanning device, from a location registry, or from another source. The location may be received in absolute terms (e.g., global coordinates) or in relative terms (e.g., within the storage facility).

At block 444, locations within a threshold distance of the scanning device location are obtained. The threshold distance may be specified for the system, for the storage facility, for the stowing resource, for the item to be stowed, or a combination of two or more of these factors. The locations may also be obtained using a direction from the current location of the scanning device. For example, it may be desirable to avoid reversing directions during the stowing process. As such, locations that are located the threshold distance away from the device location and located in a direction that has not yet been traversed by the stowage resource may be preferred.

At block 446, the locations with capacity, compatible items or nearby items (if any), satisfying the applicable stow rules, having suitable accessibility factors, and within the proper distance from the scanning device have been determined. Using the identity of these locations, an indicator type for the identified locations is determined. As discussed above, not all stowage locations identified for the item to be stored may be the same type. As such, the indicators used to identify the availability of the location may be different. Examples of indicator types include lights, graphics displays, audio, radio signals, displayable images, or the like. In some implementations, multiple indicator types may be used to indicate availability for a stowage location.

In some implementations, the type of indicator may be based on a score indicating a degree of suitability of a given location to stow the item to be stowed. The score for a stowage location may be generated using information available to the proximity directed stowage system such as characteristics of the stowage location, characteristics of the item to be stowed, characteristics of items (if any) currently stowed in the stowage location, expiration date of the item, date the stowage is performed, weather, temperature, humidity, other environmental conditions, associate performing the stowage, proximity of the scanning device to the stowage location, or the like. Various relationships between and/or combinations of the information elements may be used to generate the score. For example, if two stowage locations are within the threshold distance, a stowage location having fewer items or lower total weight may be assigned a score indicating a higher preference than the other stowage location. As another example, stowage locations having the smallest size but still capable of accommodating the item are preferred to larger bins. As yet another example, stowage locations that do not require bending or climbing by the stowage associate to access may be assigned a higher score for popular items (e.g., items associated with a velocity metric indicating the item is frequently ordered). In some implementations, a score indicating a higher preference may be generated for locations including items that are commonly retrieved with the item to be stowed. This places related items in the same stowage location which could potentially reduce the amount of time needed to retrieve the items.

At block 490, the process ends having identified a subset of eligible stowage locations and having determined to activate indicators associated with the locations.

Figure 5:
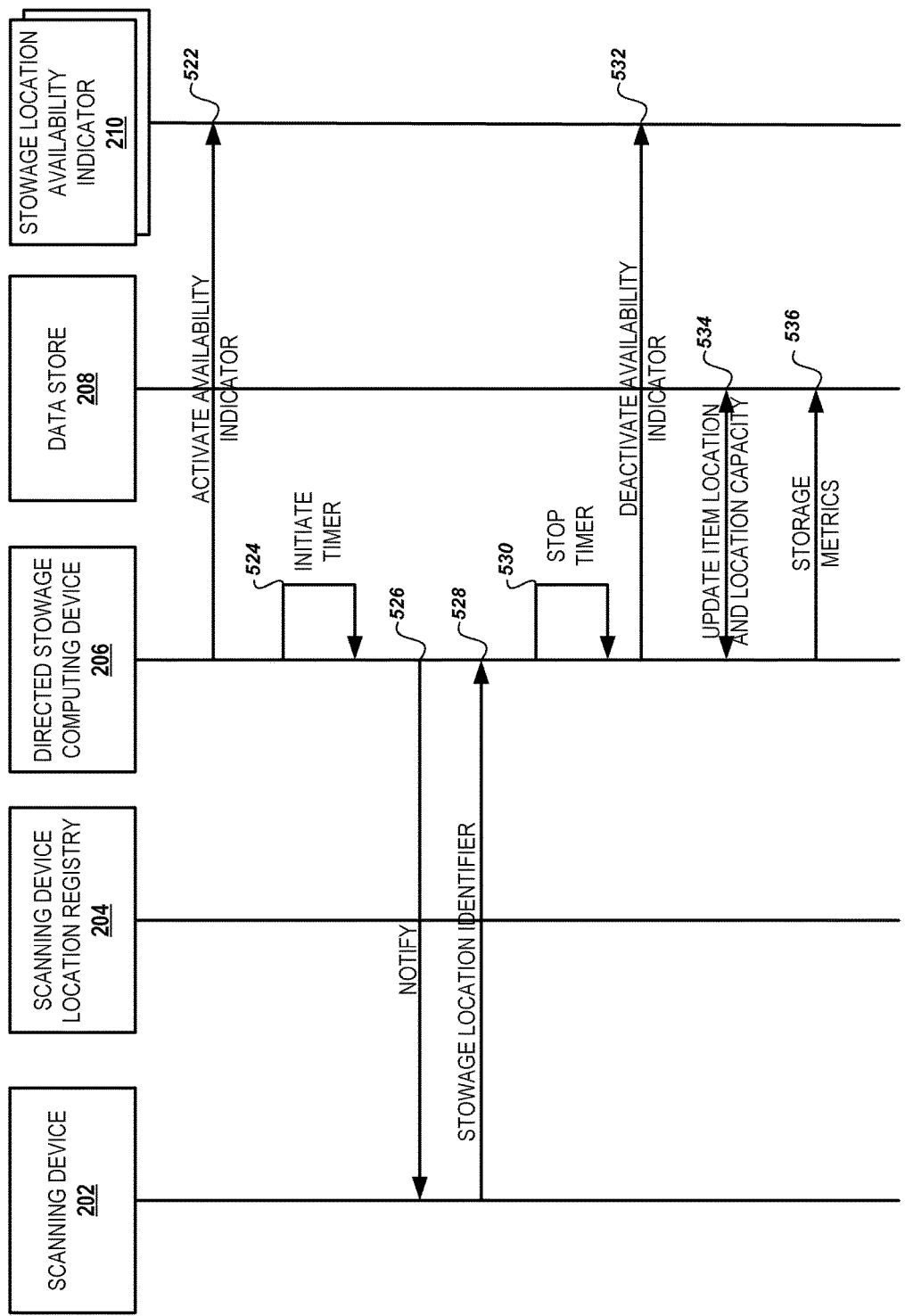
FIG. 5 is a schematic diagram of messages that may be sent between elements of a proximity directed stowage system during another example directed stowage session.

FIG. 5 is a schematic diagram of messages that may be sent between elements of a proximity directed stowage system during another example directed stowage session. Similar to FIG. 2, the diagram of FIG. 5 shows messages between the client scanning device 202, the scanning device location registry 204, the directed stowage computing device 206, the data store 208, and the stowage location availability indicator 210. It will be appreciated that other intermediary elements may be included. As with FIG. 2, for the sake of clarity, these intermediaries have been omitted from FIG. 2 and the description thereof.

The message flow shown in FIG. 5 begins with message 522 where the directed stowage computing device 206 activates the stowage location availability indicator. As there are generally multiple stowage resources (e.g., 5, 10, 15, 30, or more) stowing items at the same time, it may be desirable to prevent another recommendation of the stowage location which had its indicator activated from being recommended for storing another item at the same time. Via message 524 a timer is initiated. Initiating the timer may include setting a countdown time from which time will be reduced until no time is left and the timer is deemed expired. Initiating the timer may include starting a timer from zero and monitoring the timer for an expiration time. The timer may be used by the directed stowage computing device 206 to indicate how long to remove the stowage location from further consideration in providing recommendations of stowage locations for other items.

As shown in FIG. 5, the directed stowage computing device 206 transmits a notification via message 526 to the scanning device 202 indicating that indicators of availability for the proximate locations are activated. An indication of the timer state (e.g., time remaining, time elapsed) may also be transmitted to the scanning device 202 for presentation such as via a display. The notification message 526 may include transmitting several messages including the state of the timer as the time remaining decreases. This allows the scanning device 202 to update its display and/or other outputs (e.g., audio) to alert the stowage resource as to how much longer the availability indicators will be provided. In some implementations, the message 526 may include a displayable representation of the available locations for presentation via a display, such as the display 154, of the scanning device 202.

The associate, or other actor performing the stowage, may then identify one of the proximate stowage locations to receive the item. The identification may be through scanning an identifier for the stowage location. As with the identifiers for an item, the identifiers for stowage locations may be optically, magnetically, or wirelessly scanned. The identification information for the selected location is transmitted to the directed stowage computing device 206 via message 528.

Via message 530, the timer is stopped by the directed stowage computing device 206. Stopping the timer may include releasing the stowage location for further consideration for stowing other items. Releasing the stowage location may include setting a value associated with the stowage location in the data store 208.

At this point, the item has been stored and the availability indicators for the proximate stowage locations may be deactivated by the directed stowage computing device 206 via message 532. The directed stowage computing device 206 may be configured to update the data store 208 with the item location, stowage location capacity information, or both to reflect the receipt of the item via message 534. The directed stowage computing device 206 may also be configured to transmit stowage metrics via message 536 to the data store 208 for data storage. The stowage metrics may include the quantity of time between timer start and timer stop, the stowage location selected, the identifier of the item stowed, or a combination thereof. The stowage metrics may be used to generate a predictive model of how long locations should be removed from consideration. For example, a model may be trained to identify the optimal quantity of hold time for a particular stowage resource. This model may receive an identifier for the stowage resource and generate a recommendation time period to use for initiating the timer. Some implementations of the model may be trained to receive item or stowage location characteristics as additional inputs to generate the time. Factors such as item type or stowage location type can impact the amount of time needed from when the availability indicators are activated and when the item is stowed. For example, if the item type indicates the item is an overweight item, it may take longer to physically move the item for stowage. As such, it may be desirable to maintain the indicators longer than an average or lightweight item. As another example, certain stowage location types may be easier to access and/or stow items in than others. As such, it may be desirable to maintain indicators longer for sets including harder to access stowage locations to ensure ample time to complete the stowage. By dynamically identifying the time to present the indicators (and reserve the stowage location), the stowage locations may be reserved for a minimum quantity of time, thereby allowing fuller consideration of more stowage locations for all items to be stowed.

Figure 6:
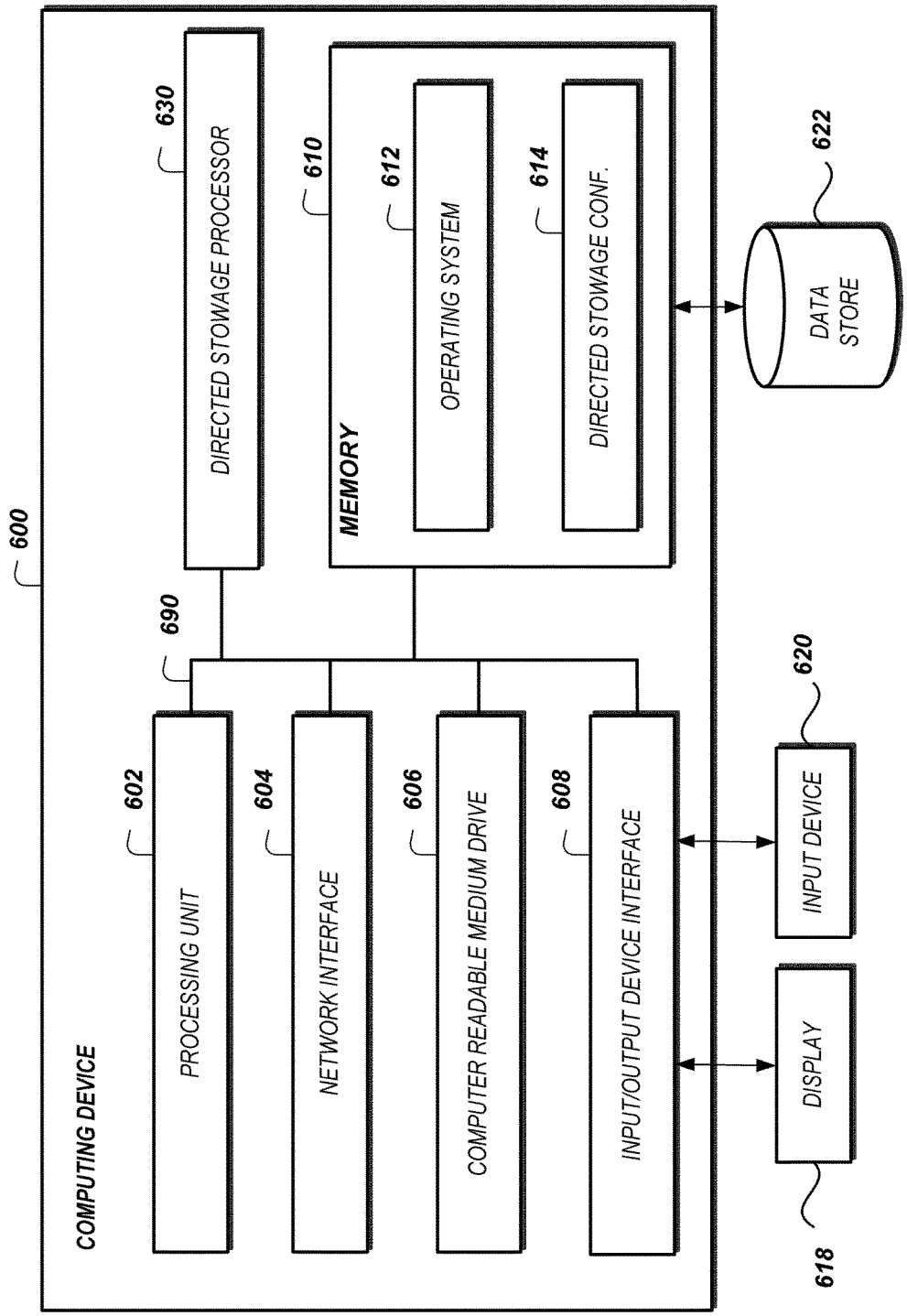
FIG. 6 is a block diagram of an illustrative computing device that implements proximity directed stowage.

FIG. 6 is a block diagram of an illustrative computing device that implements proximity directed stowage. The computing device 600 can be a server or other computing device, and can comprise a processing unit 602, a directed stowage processor 630, a network interface 604, a computer readable medium drive 606, an input/output device interface 608, and a memory 610. The network interface 604 can provide connectivity to one or more networks or computing systems. The processing unit 602 can receive information and instructions from other computing systems or services via the network interface 604. The network interface 604 can also store data directly to memory 610. The processing unit 602 can communicate to and from memory 610 and output information to an optional display 618 via the input/output device interface 608. The input/output device interface 608 can also accept input from the optional input device 620, such as a keyboard, mouse, digital pen, microphone, mass storage device, etc.

The memory 610 contains computer program instructions that the processing unit 602 executes in order to implement one or more embodiments. The memory 610 generally includes RAM, ROM, and/or other persistent, non-transitory computer readable media. The memory 610 can store an operating system 612 that provides computer program instructions for use by the processing unit 602 or other elements included in the computing device in the general administration and operation of the computing device 600. The memory 610 can further include computer program instructions and other information for implementing aspects of the present disclosure.

For example, in one embodiment, the memory 610 includes a directed stowage configuration 614. The directed stowage configuration 614 may include machine learning models, thresholds, or predetermined values as described above. The directed stowage configuration 614 may store specific values for a given configuration. The directed stowage configuration 614 may, in some implementations, store information for obtaining values for a given configuration element. For example, a default timer quantity may be specified as a network location (e.g., URL) in conjunction with username and password information to access the network location to obtain the default timer quantity.

The memory 610 may also include or communicate with one or more auxiliary data stores, such as data store 622. The data store 622 may electronically store data regarding the storage facility, stowage locations, scanning devices, items, directed stowage prediction models, and the like.

The elements included in the computing device 600 may be coupled by a bus 690. The bus 690 may be a data bus, communication bus, or other bus mechanism to enable the various components of the computing device 600 to exchange information.

In some embodiments, the computing device 600 may include additional or fewer components than are shown in FIG. 6. For example, a computing device 600 may include more than one processing unit 602 and computer readable medium drive 606. In another example, the computing device 602 may not be coupled to a display 618 or an input device 620. In some embodiments, two or more computing devices 600 may together form a computer system for executing features of the present disclosure.

As described, the availability indicators may be activated to indicate stowage locations in which an item can be stowed. It may be desirable in some implementations to provide negative stowage indicators in addition or as an alternative to the availability indicator. For example, the system may determine that a stowage location proximate to the scanning device includes an item that cannot be stowed with any other items. In such instances, when activating indicators for proximate stowage locations, it may be desirable to activate an indicator, which indicates to the associate stowing the item, that the item cannot be stowed in the stowage location including the sensitive item.

Various features for directing stowage have been described. Additional or alternative features which may be implemented in the embodiments described include stowage to avoid storing duplicate items within the same stowage location and/or stowage locations identified to ensure an even distribution of items across the storage facility (e.g., space utilization).

In several examples, the scanning of an item was used to describe the directed stowage features. In some implementations, the location determining equipment may be integrated with a container or cart in which the item to be stowed is traveling. In such implementations, the container or cart may provide the location information rather than or in conjunction with the scanning device.

In some implementations, the container or cart may be scanned to provide an identifier of all items with the container or cart. In such implementations, the system may determine a starting location for the stowage and recommend a first item for stowing. As such, the stowage resource may be directed to an area of the storage facility that will have a high density of available stowage locations for the items within the container or cart. In some implementations, it may be desirable to provide clues to the stowage resource as to where these areas might exist. For example a heat-map may be generated indicating relative density of available stowage locations, such as those which can accommodate the items within the container or cart. The density may indicate available stowage locations as a function of space. As an alternative or additional feature, the heat-map may be generated indicating relative frequency of available stowage space. The frequency may indicate the how often an available stowage location may be encountered. The frequency may indicate available stowage locations as a function of time. Using the heat-map, the stowage resource may identify a starting location to accommodate the items to be stowed. In some implementations, the availability indicators may be displayed on a heat-map.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a directed stowage computing device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A directed stowage computing device can be or include a microprocessor, but in the alternative, the directed stowage computing device can be or include a controller, microcontroller, or state machine, combinations of the same, or the like configured to receive and process image data. A directed stowage computing device can include electrical circuitry configured to process computer-executable instructions. Although described herein primarily with respect to digital technology, a directed stowage computing device may also include primarily analog components. For example, some or all of the directed stowage algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a directed stowage computing device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the directed stowage computing device such that the directed stowage computing device can read information from, and write information to, the storage medium. In the alternative, the storage medium can be integral to the directed stowage computing device. The directed stowage computing device and the storage medium can reside in an ASIC. The ASIC can reside in a user terminal. In the alternative, the directed stowage computing device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
    a computer-readable memory storing specific computer-executable instructions; and
    a computing system in communication with the computer-readable memory, the computing system including a computer processor that executes the specific computer-executable instructions to cause the computing system to at least:
        detect an item identifier for an item to be stowed in a storage facility;
        identify eligible stowage locations within the storage facility based at least in part on a characteristic of the item to be stowed, each eligible stowage location having capacity to accommodate the item to be stowed;
        determine a physical location within the storage facility where the item identifier for the item to be stowed was detected;
        identify a subset of the eligible stowage locations that are within a threshold distance from the physical location; and
        for at least one eligible stowage location of the subset of eligible stowage locations that are within the threshold distance, activate an indicator associated with the at least one eligible stowage location.

2. The system of claim 1, wherein the computer processor further executes the specific computer-executable instructions to cause the computing system to at least:
    monitor a time period during which the subset of eligible stowage locations that are within the threshold distance from the physical location are eligible to receive the item to be stowed; and
    for the at least one eligible stowage location in the subset of eligible stowage locations, deactivate the indicator associated with the at least one eligible stowage location upon expiration of the time period.

3. The system of claim 1, wherein the computer processor further executes the specific computer-executable instructions to cause the computing system to identify eligible stowage locations by causing the computing system, for at least one eligible stowage location, to at least one of:
    determine that no items are stowed in the eligible stowage location; or
    determine that the characteristic of the item to be stowed is compatible with a characteristic of an item stowed in:
        (i) the eligible stowage location, or
        (ii) another stowage location within a predetermined distance from the eligible stowage location.

4. The system of claim 1, wherein the computer processor further executes specific computer-executable instructions to cause the computing system to at least:
    detect a stowage location identifier of at least one eligible stowage location; and
    reduce the available capacity for the at least one eligible stowage location indicated by the stowage location identifier by a capacity used by the item to be stowed.

5. The system of claim 1, wherein the computer processor further executes specific computer-executable instructions to cause the computing system to at least:
    detect a stowage location identifier of a stowage location not included in the subset of eligible stowage locations; and
    receive feedback information regarding use of the stowage location.

6. The system of claim 5, wherein the computer processor further executes specific computer-executable instructions to at least cause the computing system to identify eligible stowage locations based at least in part on previously received feedback information.

7. The system of claim 1, wherein the computer processor further executes specific computer-executable instructions to cause the computing system to at least:

generate an estimated stowage time for the item to be stowed; and identify the subset of eligible stowage locations further based at least in part on the estimated stowage time and an accessibility factor for at least one eligible stowage location, wherein the accessibility factor indicates accessibility to the at least one eligible stowage location.

8. The system of claim 7, wherein the computer processor further executes specific computer-executable instructions to cause the computing system to at least generate a score for an eligible stowage location included in the subset of the eligible stowage locations, the score indicating a ranking for the eligible stowage location as compared to other eligible stowage locations of the subset of the eligible stowage locations.

9. The system of claim 8, wherein the computer processor further executes specific computer-executable instructions to cause the computing system to generate the score by determining a relationship between a physical property of the item to be stowed and a characteristic of the eligible stowage location.

10. The system of claim 1, wherein the computer processor further executes specific computer-executable instructions to at least cause the computing system to display a heat-map indicating available capacity of the eligible stowage locations within an area of the storage facility.

11. The system of claim 10, wherein the computer processor further executes specific computer-executable instructions to at least cause the computing system to display indicators for nearby eligible stowage locations on the heat-map.

12. A computer-implemented method comprising:

detecting an item identifier for an item to be stowed in a storage facility;

identifying eligible stowage locations within the storage facility based at least in part on a characteristic of the item to be stowed, each eligible stowage location having capacity to accommodate the item to be stowed;

determining a physical location within the storage facility where the item identifier for the item to be stowed was detected; and for a subset of the eligible stowage locations that are within a threshold distance from the physical location of the portable scanning device, activate an indicator associated with each eligible stowage location in the subset.

13. The computer-implemented method of claim 12, further comprising:

monitoring a time period during which the subset of eligible stowage locations that are within the threshold distance from the physical location are ineligible to receive another item for stowage; and for each eligible stowage location in the subset of eligible stowage locations, deactivating the indicator associated with the at least one eligible stowage location upon expiration of the time period.

14. The computer-implemented method of claim 12, wherein identifying eligible stowage locations includes at least one of:

for at least one eligible stowage location, determining that no items are stowed in the eligible stowage location; or determining that the characteristic of the item to be stowed is compatible with a characteristic of an item stowed in:

(i) the eligible stowage location, or (ii) another stowage location within a predetermined distance from the eligible stowage location.

15. The computer-implemented method of claim 12, further comprising:

detecting a stowage location identifier of at least one eligible stowage location; and reducing the available capacity for the at least one eligible stowage location indicated by the stowage location identifier by a capacity used by the item to be stowed.

16. The computer-implemented method of claim 12, further comprising:

detecting a stowage location identifier of a stowage location not included in the subset of eligible stowage locations; and receiving feedback information regarding use of the stowage location.

17. The computer-implemented method of claim 16, further comprising identifying eligible stowage locations based at least in part on previously received feedback information.

18. The computer-implemented method of claim 12, further comprising:

generating an estimated stowage time for the item to be stowed; and identifying the subset of eligible stowage locations further based at least in part on the estimated stowage time and an accessibility factor for at least one eligible stowage location, wherein the accessibility factor indicates accessibility to the at least one eligible stowage location.

19. The computer-implemented method of claim 12, further comprising generating a score for an eligible stowage location included in the subset of the eligible stowage locations, the score indicating a ranking for the eligible stowage location as compared to other eligible stowage locations of the subset of the eligible stowage locations.

20. The computer-implemented method of claim 19, wherein generating the score comprises determining a relationship between a physical property of the item to be stowed and a characteristic of the eligible stowage location.

* * * * *